(12) United States Patent
Yamamoto et al.

(10) Patent No.: US 9,030,060 B2
(45) Date of Patent: *May 12, 2015

(54) GALVANOSCANNER AND LASER PROCESSING MACHINE

(71) Applicant: Via Mechanics, Ltd., Ebina-shi, Kanagawa (JP)

(72) Inventors: Akihiro Yamamoto, Hitachinaka (JP); Akira Doi, Hitachinaka (JP); Daisuke Matsuka, Hitachinaka (JP); Souichi Toyama, Ebina (JP); Hiroyuki Sugawara, Ebina (JP)

(73) Assignee: Via Mechanics, Ltd., Ebina-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,523

(22) Filed: Jun. 5, 2014

(65) Prior Publication Data

US 2014/0285036 A1 Sep. 25, 2014

Related U.S. Application Data

(62) Division of application No. 13/282,837, filed on Oct. 27, 2011, now Pat. No. 8,780,429.

(30) Foreign Application Priority Data

Oct. 29, 2010 (JP) .................................. 2010-244421

(51) Int. Cl.
*H02K 33/00* (2006.01)
*G02B 26/10* (2006.01)
(Continued)

(52) U.S. Cl.
CPC .............. *H02K 33/00* (2013.01); *G02B 26/105*
(2013.01); *H02K 1/276* (2013.01); *H02K 1/2766* (2013.01); *H02K 26/00* (2013.01);
(Continued)

(58) Field of Classification Search
CPC ....... H02K 21/14; H02K 21/12; H02K 1/276; H02K 1/2766; H02K 33/00; G02B 26/105
USPC .............. 359/199.3, 200.7, 200.1; 310/36, 38
See application file for complete search history.

(56) References Cited

U.S. PATENT DOCUMENTS 6,265,801 B1 7/2001 Hashiba et al.
7,242,123 B2 * 7/2007 Miyawaki ................ 310/156.32
(Continued)

FOREIGN PATENT DOCUMENTS

JP 11-252835 A 9/1999
JP 2007-6626 A 1/2007
JP 2008-43133 A 2/2008

*Primary Examiner* — James Phan
(74) *Attorney, Agent, or Firm* — Crowell & Moring LLP

(57) ABSTRACT

A galvanoscanner including: a rotor including a shaft as a rotational center, and permanent magnets disposed around the shaft and polarized to a plurality of poles in a circumferential direction of the shaft; and a stator disposed in the outside of the rotor through a clearance and including coils, a yoke, and an outer casing so that the rotor swings in a predetermined angle range; wherein: the permanent magnets are provided with grooves which are formed in a direction of the rotation shaft so as to straddle circumferentially adjacent magnetic poles of the permanent magnets; and the permanent magnets are parted into at least two parts per pole by parting lines. Thus, the ratio of the torque constant to the moment of inertia can be improved so that the current required for driving can be reduced and reduction of power consumption at driving time can be attained.

3 Claims, 11 Drawing Sheets

(51) Int. Cl.
*H02K 1/27* (2006.01)
*H02K 26/00* (2006.01)
*H02K 21/14* (2006.01)
*H02K 21/12* (2006.01)

(52) U.S. Cl.
CPC ........... *H02K 2213/03* (2013.01); *H02K 21/12* (2013.01); *H02K 21/14* (2013.01)

(56) References Cited

U.S. PATENT DOCUMENTS

2007/0007828 A1    1/2007   Doi et al.
2008/0036309 A1    2/2008   Toyama et al.

* cited by examiner

FIG. 13
| PARTING LINE THICKNESS [mm] | DECREASING RATE OF EDDY CURRENT LOSS (UP TO 10kHz) [%] |
|---|---|
| 0.05 | 55 |
| 0.10 | 56 |
| 0.15 | 57 |
| 0.20 | 57 |
FIG. 14
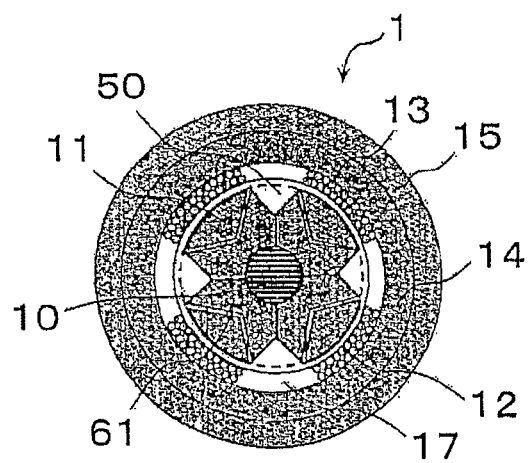
FIG. 15
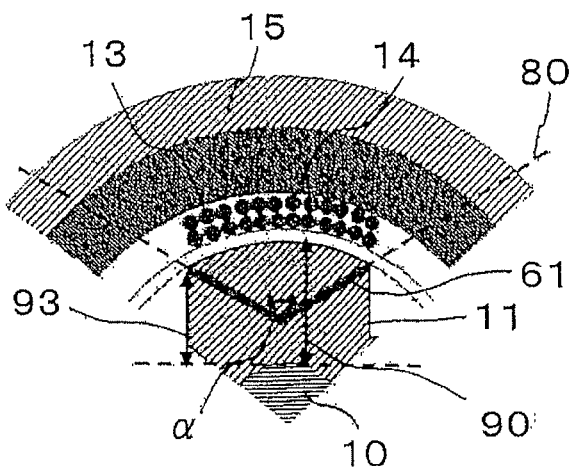

FIG. 16
| (RATE OF) PARTING CUTTING POSITION 93 FROM SHAFT (TO THICKNESS 90 OF PERMANENT MAGNET) [%] | PARTING OPEN ANGLE [°] | DECREASING RATE OF EDDY CURRENT LOSS (UP TO 10kHz) [%] |
| --- | --- | --- |
| 77.4 | 102 | 69 |
| 77.4 | 110 | 71 |
| 77.4 | 120 | 73 |
| 77.4 | 150 | 70 |
| 77.4 | 180 | 56 |
FIG. 17
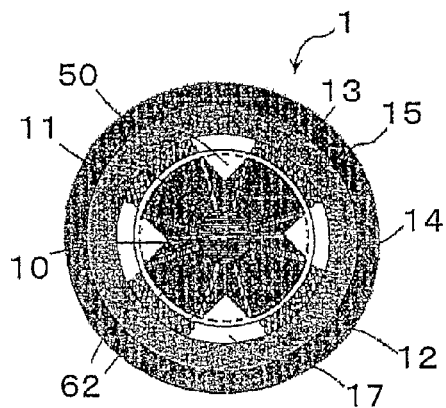
FIG. 18
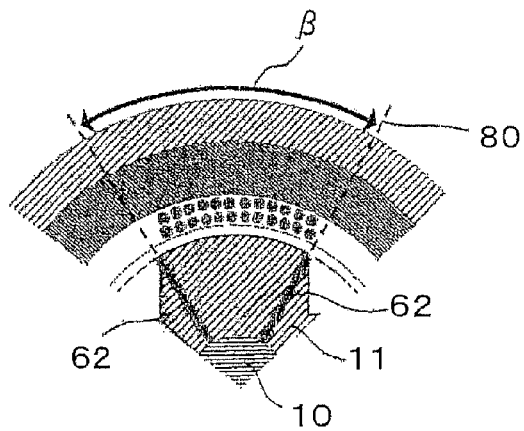

FIG. 19
| ANGLE β BETWEEN ADJACENT PARTING LINES [°] | DECREASING RATE OF EDDY CURRENT LOSS (UP TO 10kHz) [%] |
|---|---|
| 44 | 37 |
| 60 | 49 |
| 94 | 65 |
FIG. 20
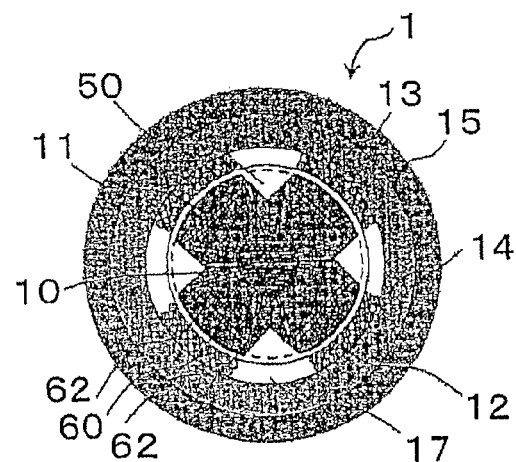
FIG. 21
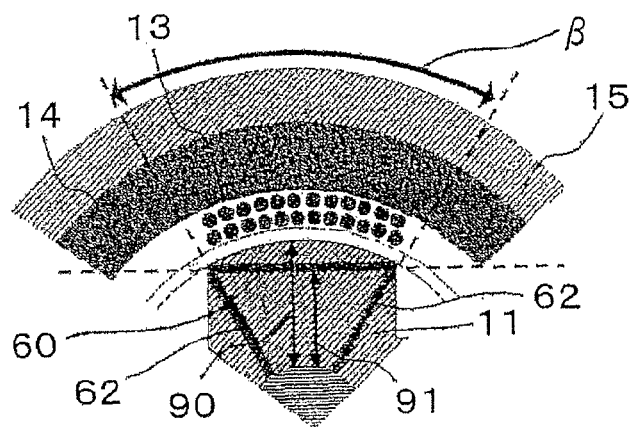

FIG. 22
| RATE OF PARTING LINE POSITION 91 TO THICKNESS 90 OF PERMANENT MAGNET [%] | ANGLE β BETWEEN ADJACENT PARTING LINES [°] | DECREASING RATE OF EDDY CURRENT LOSS (UP TO 10kHz) [%] |
|---|---|---|
| 77.4 | 44 | 70 |
| 77.4 | 60 | 76 |
| 77.4 | 94 | 82 |
FIG. 23
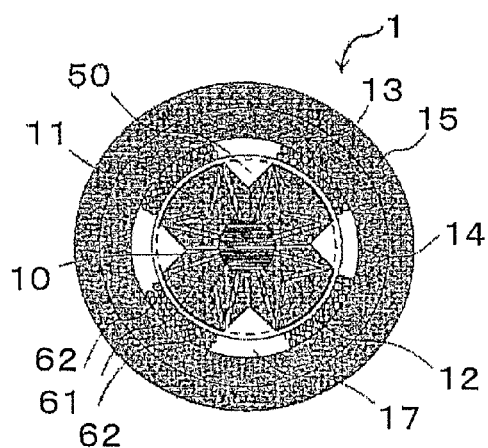
FIG. 24
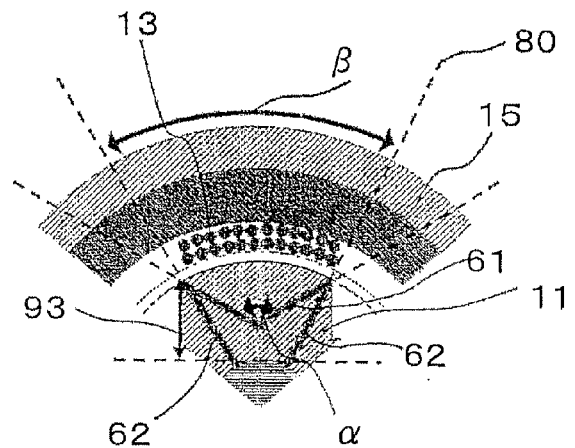

| (RATE OF) PARTING CUTTING POSITION 93 FROM SHAFT (TO THICKNESS 90 OF PERMANENT MAGNET) [%] | PARTING OPEN ANGLE $\alpha$ [°] | ANGLE $\beta$ BETWEEN ADJACENT PARTING LINES [°] | DECREASING RATE OF EDDY CURRENT LOSS (UP TO 10kHz) [%] |
|---|---|---|---|
| 77.4 | 120 | 44 | 78 |
| 77.4 | 120 | 60 | 80 |
| 77.4 | 120 | 94 | 78 |

…

GALVANOSCANNER AND LASER PROCESSING MACHINE

CROSS REFERENCE TO RELATED APPLICATIONS

This application is a division of U.S. application Ser. No. 13/282,837, filed Oct. 27, 2011, which claims priority from Japan 2010-244421, filed Oct. 29, 2010, the disclosures of which are expressly incorporated by reference herein.

BACKGROUND OF THE INVENTION

1. Field of the Invention

The present invention relates to a galvanoscanner and a laser processing machine for optically writing data into a to-be-written medium. Particularly, it relates to a galvanoscanner in which permanent magnets disposed around a shaft and polarized into poles in a circumferential direction of the shaft are used as a rotor, and a laser processing machine equipped with the galvanoscanner.

2. Description of the Background Art

A device for drilling a printed wiring board is roughly classified into a drilling processing machine which performs drilling with a drill and a laser processing machine which performs drilling with a laser beam. On the other hand, a printed wiring board has been multi-layered recently and holes for mounting elements or the like or interlayer connection holes have been arranged densely so that the number of holes per sheet has been increasing. For this reason, the drilling device is shifting from a drilling processing machine to a laser processing machine. Increase in drilling speed is required of the laser processing machine in accordance with increase in the number of holes.

As shown in FIG. 26, the laser processing machine generally performs drilling in such a manner that laser light 111 emitted from a laser light source 110 is deflected and scanned by galvanoscanners 1 and condensed onto a printed wiring board 113 by an fθ lens 112. On this occasion, it is necessary to increase the response speed of each galvanoscanner 1 in accordance with the increase in drilling speed, and it is necessary to increase the current flowing in a coil to increase the response speed of each galvanoscanner 1. However, Joule heat produced in the coil increases as the current flowing in the coil increases. Incidentally, each galvanoscanner 1 is provided with a galvanomirror 100 attached to one end of a shaft of the galvanoscanner 1, so that laser light 111 is deflected by swinging of the galvanomirror 100 so as to be scanned on the printed wiring board 113.

The Joule heat produced in the coil is transmitted to a permanent magnet used as a rotor through a clearance, so that the temperature of the permanent magnet increases. In the case of high-speed response, the temperature of the permanent magnet further increases because the eddy current flowing in the permanent magnet increases. The temperature rise demagnetizes the permanent magnet to reduce rotating torque. As a result, electric power consumption at driving time increases. That is, increase in electric power consumption at the time of driving the galvanoscanner was unavoidable in accordance with increase in response frequency.

Therefore, for example, techniques to suppress such increase in electric power consumption have been proposed in JP-A-Hei-11-252835, JP-A-2008-43133 and JP-A-2007-6626. Of these, JP-A-Hei-11-252835 has disclosed an invention of a rotor of a permanent magnet type electric rotating machine having a rotating magnetic field formed from an iron-containing permanent magnet on a rotor core fixed to a rotation shaft to reduce eddy currents generated in a surface of the permanent magnet forming the rotating excitation field, wherein: the rotating excitation field includes a plurality of parted permanent magnet units arranged in the axial direction of the rotation shaft, and an electrically insulating layer is disposed between adjacent end surfaces of adjacent two of the parted permanent magnet units so as to prevent eddy currents from flowing straddle the adjacent two parted permanent magnet units.

JP-A-2008-43133 has disclosed an invention of a rotary actuator device including: a rotor having a rotation shaft and permanent magnets disposed around the rotation shaft; a stator disposed around the rotor and having coils and a yoke; and a housing for receiving the rotor and the stator to suppress increase of the temperature of the permanent magnets in the movable magnet type actuator device to prevent deterioration of hole position accuracy so that the rotor is swung in a predetermined angle range; wherein: radial grooves opened toward the stator and having a depth not smaller than a skin depth represented by a function of the volume resistivity and permeability of the permanent magnets and the fundamental frequency of the current flowing in the coils are formed in the permanent magnets.

JP-A-2007-6626 has disclosed an invention of a scanner including: a rotor having a shaft and permanent magnets attached to an outer circumferential side of the shaft; and a stator disposed in the outside of the rotor and having a casing, a yoke held in an inner circumferential side of the casing and coils disposed in an inner circumferential side of the yoke to uniformize the torque constant of the scanner to attain improvement in positioning accuracy; wherein: the permanent magnets of the rotor are provided with grooves formed in the outer circumferential portions of the permanent magnets so as to be radially concavely curved so that the torque constant of the scanner is uniformized circumferentially by the grooves.

As described above, JP-A-Hei-11-252835 has described that an electrically insulating layer is disposed between adjacent end surfaces of adjacent two of parted permanent magnet units so as to prevent eddy currents from flowing straddle the adjacent two parted permanent magnet units. JP-A-2008-43133 has described that radial grooves are formed in permanent magnets to suppress generation of eddy currents. JP-A-2007-6626 has described only circumferential uniformization of the torque constant. In any case, each of these aforementioned inventions intends to attain reduction of power consumption. However, the ratio of the torque constant to the moment of inertia in the galvanoscanner presents a problem in order to attain reduction of power consumption.

However, in the inventions described in JP-A-Hei-11-252835, JP-A-2008-43133 and JP-A-2007-6626, there is no particular consideration about the ratio of the torque constant to the moment of inertia.

SUMMARY OF THE INVENTION

Therefore, an object of the invention is to improve the ratio of the torque constant to the moment of inertia to reduce the current required for driving to thereby reduce power consumption at driving time.

To achieve the foregoing object, according to a first configuration of the invention, there is provided a galvanoscanner including: a rotor including a shaft as a rotational center, and permanent magnets disposed around the shaft and polarized to a plurality of poles in a circumferential direction of the shaft; and a stator disposed in the outside of the rotor through a clearance and including coils, a yoke, and an outer casing so that the rotor swings in a predetermined angle range; wherein: the permanent magnets are parted into at least two parts per pole by parting lines.

According to a second configuration of the invention, there is provided a galvanoscanner according to the first configuration, wherein: the permanent magnets are provided with grooves which are formed in a direction of the rotation shaft so as to straddle circumferentially adjacent magnetic poles of the permanent magnets.

According to a fifth configuration of the invention, there is provided a galvanoscanner according to the second configuration, wherein: the grooves are always located at places facing hollow portions not wound with the coils in a swinging range of the galvanoscanner.

According to a sixth configuration of the invention, there is provided a galvanoscanner according to any one of the first to third configurations, wherein: each of the parting lines has a straight line-shaped section.

According to a seventh configuration of the invention, there is provided a galvanoscanner according to any one of the first to third configurations, wherein: each of the parting lines has a broken line-shaped section convexly curved toward the shaft.

According to an eighth configuration of the invention, there is provided a galvanoscanner according to any one of the first to third configurations, wherein: each of the parting lines has a section shaped like at least one straight line for parting corresponding one of the permanent magnets circumferentially.

According to a ninth configuration of the invention, there is provided a galvanoscanner according to any one of the first to third configurations, wherein: each of the parting lines includes two parting lines for parting corresponding one of the permanent magnets circumferentially, and a parting line for parting the permanent magnet radially.

According to a tenth configuration of the invention, there is provided a galvanoscanner according to any one of the first to third configurations, wherein: the parting lines include parting lines for parting the permanent magnets circumferentially, and broken line-shaped parting lines for parting the permanent magnets radially.

According to an eleventh configuration of the invention, there is provided a laser processing machine including: a galvanoscanner according to any one of the first to third configurations.

According to the invention, the permanent magnets are parted into at least two parts per pole by parting lines, so that the ratio of the torque constant to the moment of inertia can be improved to reduce the current required for driving to thereby reduce power consumption at driving time.

BRIEF DESCRIPTION OF THE DRAWINGS

FIG. 13 is a view showing the relation between the thickness of each parting line and the decreasing rate of eddy current loss;

FIG. 14 is a cross sectional view of a galvanoscanner according to a modification of Embodiment 1 in which each parting line is shaped like a broken line;

FIG. 15 is a sectional view showing the configuration of important part of the rotor in FIG. 14;

FIG. 16 is a view showing the decreasing rate of eddy current loss in the galvanoscanner according to the modification of Embodiment 1;

FIG. 17 is a cross sectional view of a galvanoscanner according to Embodiment 2;

FIG. 18 is a sectional view showing the configuration of important part of a rotor in FIG. 17;

FIG. 19 is a view showing the decreasing rate of eddy current loss in the galvanoscanner according to Embodiment 2;

FIG. 20 is a cross sectional view of a galvanoscanner according to Embodiment 3;

FIG. 21 is a sectional view showing the configuration of important part of a rotor in FIG. 20;

FIG. 22 is a view showing the decreasing rate of eddy current loss in the galvanoscanner according to Embodiment 3;

FIG. 23 is a cross sectional view of a galvanoscanner according to Embodiment 4;

FIG. 24 is a sectional view showing the configuration of important part of a rotor in FIG. 23;

DETAILED DESCRIPTION OF THE INVENTION

Embodiments of the invention will be described below with reference to the drawings.

Embodiment 1

Figure 1:
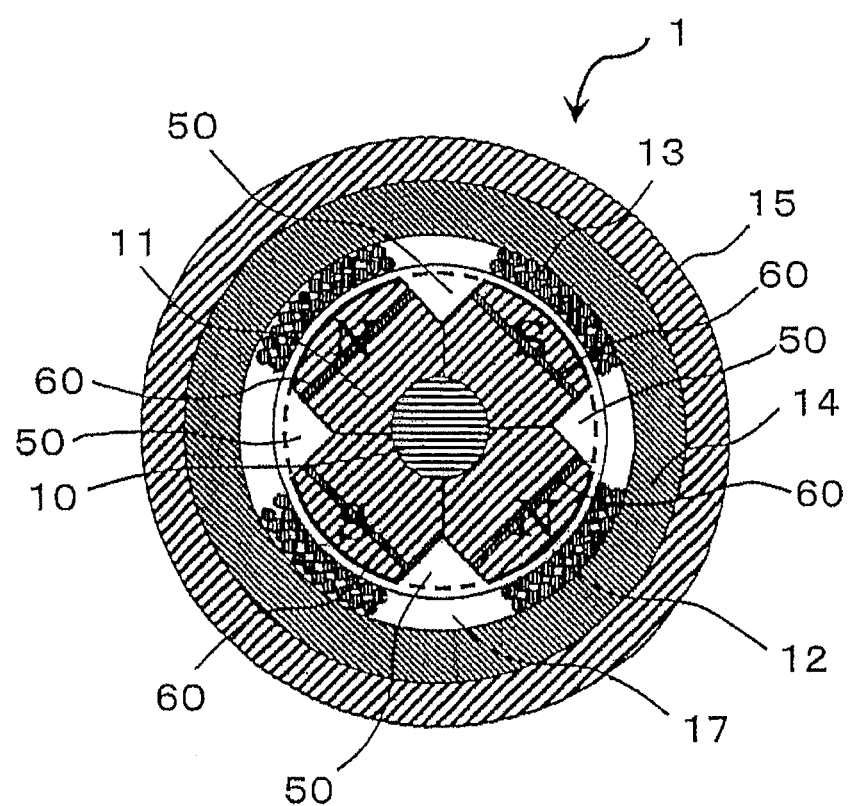
FIG. 1 is a horizontal sectional view showing the configuration of a galvanoscanner according to Embodiment 1 of the invention.
Figure 2:
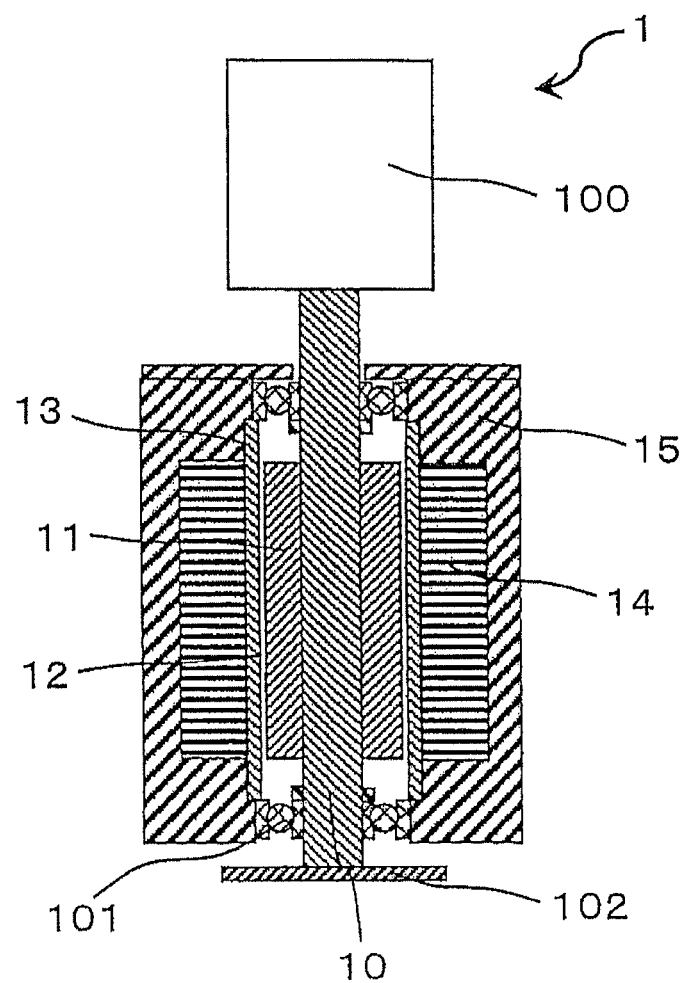
FIG. 2 is a vertical sectional view showing the galvanoscanner depicted in FIG. 1.
Figure 3:
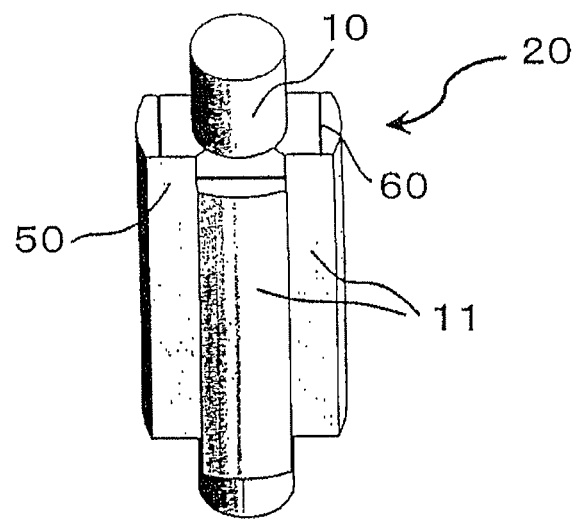
FIG. 3 is a perspective view of a rotor.
Figure 4:
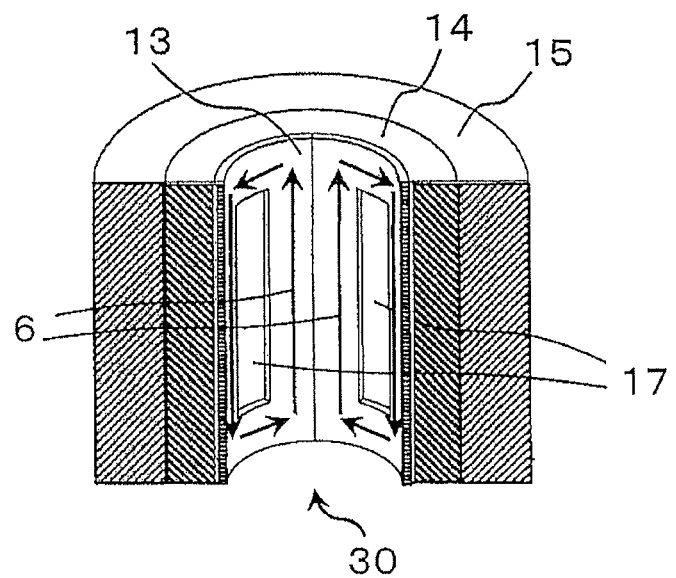
FIG. 4 is a perspective view showing the inside of a stator in section.

FIG. 1 is a cross sectional view showing the configuration of a galvanoscanner according to Embodiment 1 of the invention. FIG. 2 is a vertical sectional view showing the configuration of the galvanoscanner. FIG. 3 is a perspective view of a rotor. FIG. 4 is a perspective view showing the inside of a stator in section.

The galvanoscanner 1 has a rotor 20 shown in FIG. 3, and a stator 30 shown in FIG. 4. As shown in FIGS. 1 and 2, the rotor 20 is disposed inside of the stator 30 so as to be rotatably supported to the stator 30 on both end portion sides of a shaft 10 of the rotator 20 through shaft bearings 101. The rotor 20 includes the shaft 10 and permanent magnets 11. The stator 30 includes coils 13, a yoke 14 and an outer casing 15. Accordingly, as shown in FIGS. 1 and 2, the galvanoscanner 1 is formed so that the shaft 10, the permanent magnets 11, a clearance 12, the coils 13, the yoke 14 and the outer casing 15 are disposed in the named order from the inside of the galvanoscanner 1.

As shown in FIG. 2, the rotor 20 is formed so that some degree of freedom is provided around the shaft 10 which is a rotation shaft. A mirror 100 is attached to one end of the shaft 10. An encoder 102 for detecting the rotation angle of the mirror 100 is attached to the other end of the shaft 10. Incidentally, the shaft bearings 101 are attached to the outer casing 15 so that the shaft bearings 101 rotatably support the shaft 10 at both end portions of the outer casing 15.

In FIG. 1, the permanent magnets 11 are constituted by permanent magnets made of metal such as ferrite, samarium cobalt, neodymium, etc. As shown in FIG. 1, N poles and S poles are arranged as magnetic poles of outer circumferential surfaces of the permanent magnets 11. The magnetic poles of surfaces of adjacent ones of the permanent magnets 11 have polarities reverse to each other. The permanent magnets 11 are provided with grooves 50 each of which is formed along the direction of the rotation shaft of the permanent magnets 11 so as to straddle circumferentially adjacent magnetic poles of the permanent magnets 11. The grooves 50 are formed in the circumferential direction of the shaft 10. In FIG. 1, four grooves 50 are formed in the circumferential direction. Each groove 50 extends along the shaft direction with a cutting edge angle θ which will be described later with reference to FIG. 9. Incidentally, in the example shown in FIG. 1, the cutting edge angle θ is 90°.

Because the case of four poles is used in this embodiment, the coils 13 are disposed at four places at circumferential intervals of 90° so as to correspond to the number of magnetic poles of the permanent magnets 11. Currents 6 flow in the coils 13 wound as shown in FIG. 4. That is, currents flow in the coils 13 wound perpendicularly to the paper of FIG. 1 so that directions of the currents in the coils 13 circumferentially separate by ±90° from one another are reversed alternately.

The permanent magnets 11 characterized by the invention are provided with the grooves 50 which improve the ratio of the torque constant to the moment of inertia (torque-to-inertia ratio) and which are formed as four grooves in the direction of the rotation shaft so as to straddle circumferentially adjacent magnetic poles of the permanent magnets 11 as described above. Portions not wound with the coils 13 in the swinging range of the galvanoscanner 1, that is, coil hollow portions 17 always face the grooves 50.

As shown in FIG. 1, the permanent magnets 11 are provided with parting lines 60 with respect to the respective magnetic poles. The parting lines 60 are formed perpendicularly to the grooves 50 between which the magnetic poles are put. The parting lines 60 are provided in parallel with the shaft 10 as if the parting lines 60 were chords in the permanent magnets 11 shaped like a column without the grooves 50. Both ends of each chord are formed to reach grooves 50 on both sides to thereby part a corresponding permanent magnet 11 in the radial direction. That is, there is provided a structure in which the parted permanent magnets 11 are bonded to one another through adhesive layers forming the parting lines 60.

Figure 5:
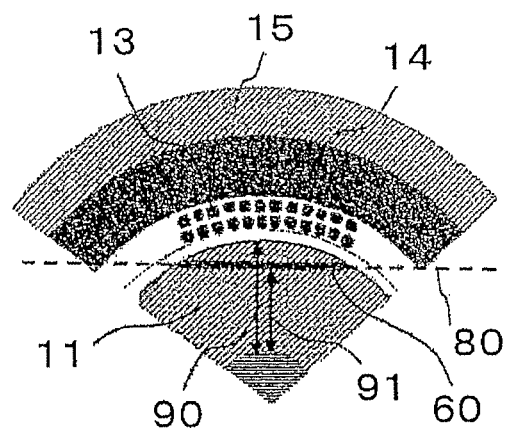
FIG. 5 is a sectional view showing the configuration of important part of the rotor in the case where parting lines are provided but grooves are not provided.
Figure 7:
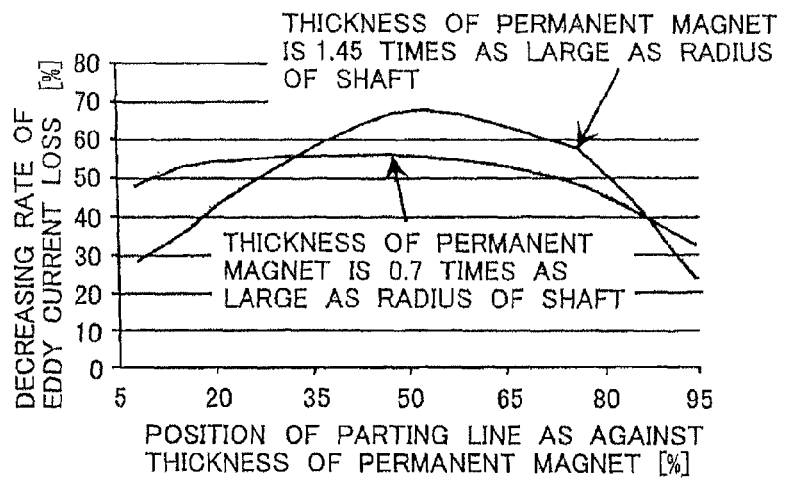
FIG. 7 is a characteristic graph showing the decreasing rate of eddy current loss in Embodiment 1.

The decreasing rate of eddy current loss and the ratio of the torque constant to the moment of inertia (torque-to-inertia ratio) with provision of the grooves 50 are now compared with those without provision of the grooves 50. FIG. 7 is a characteristic graph showing the decreasing rate of eddy current loss. In FIG. 7, the horizontal axis shows the position of the parting line 60 relative to the thickness 90 of the permanent magnet 11, and the vertical axis shows the decreasing rate of eddy current loss. Incidentally, as shown in FIG. 5 which is a sectional view of important part when the grooves 50 are not formed, the thickness 90 is equal to a distance from the outer circumference of the shaft 10 to the outer circumference of the permanent magnet 11, and the position of the parting line 60 is equal to a distance from the outer circumference of the shaft 10 to a center line 80 of the parting line 60. FIG. 7 shows the decreasing rate of eddy current loss as against without provision of the parting lines 60 and the grooves 50 when the diameter of the shaft 10 is 8 mm, the thickness of the parting line 60 is 0.1 mm and the thickness of the permanent magnet 11 is 0.7 times or 1.45 times as large as the radius of the shaft 10. Incidentally, the position of the parting line 60 represented by the horizontal axis is expressed in the rate of the distance 91 between the shaft 10 and the parting line 60 to the thickness 90 of the permanent magnet. The distance 91 is a distance to the center line 81 of the parting line from the shaft 10. The parting line 60 can be produced when the position of the parting line 60 is in a range of 7.5% to 95%.

As a result, the decreasing rate of eddy current loss is larger than 20% regardless of the thickness 90 of the permanent magnet 11 and the position of the parting line 60. In any case, eddy current losses can be reduced compared with the case where the grooves 50 and the parting lines 60 are not provided. In addition, when the position of the parting line 60 is about 50%, the decreasing rate of eddy current loss is the largest regardless of the thickness 90 of the permanent magnet 11.

Figure 6:
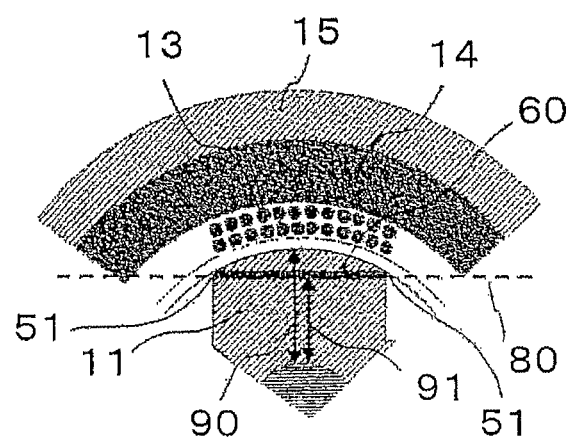
FIG. 6 is a sectional view showing the configuration of important part of the rotor in the case where both parting lines and grooves are provided.

Next, the case where the grooves 50 are provided and the case where the grooves 50 are not provided are compared with each other with reference to FIGS. 5 and 6. FIG. 5 shows the case where the parting lines 60 are provided but the grooves 50 are not provided in the rotor 20. FIG. 6 shows the case where the parting lines 60 and the grooves 50 are provided. When the position of a parting line 60 is 77.4% of the thickness of a permanent magnet 11 in the condition that the permanent magnet 11 has a diameter of 19.6 mm and the shaft 10 has a diameter of 8 mm, an end point 51 of a groove 50 passes through the center line 80 of the parting line 60 as shown in FIG. 6. Assuming now that the angle (cutting edge angle) θ (see FIG. 9) of the groove 50 is 90° and the angle φ (see FIG. 8) of the permanent magnet 11 is 60°, then the decreasing rate of eddy current loss with provision of the grooves 50 is 56% which is effective by about 10% compared with 47% which is the decreasing rate of eddy current loss without provision of the grooves 50 as shown in FIG. 7.

Figure 8:
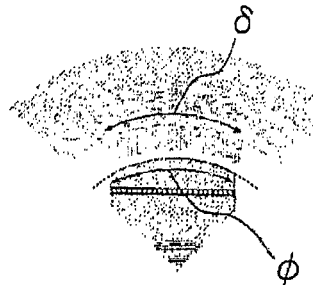
FIG. 8 is a sectional view showing the configuration of important part of the rotor for explaining a permanent magnet angle.
Figure 9:
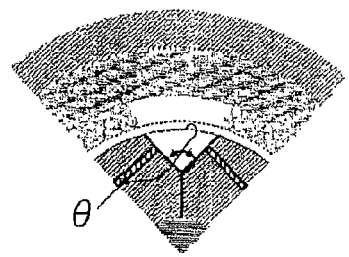
FIG. 9 is a sectional view showing the configuration of important part of the rotor for explaining a groove angle.
Figure 10:
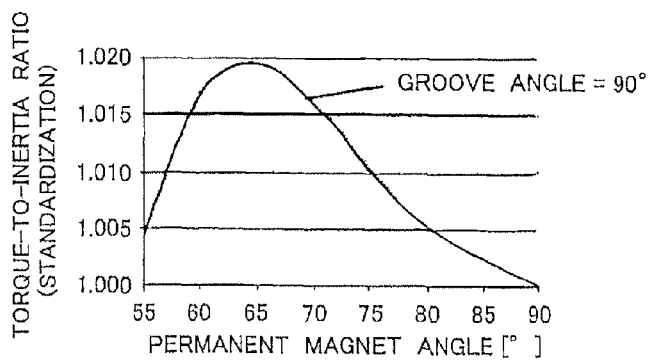
FIG. 10 is a characteristic graph showing the relation between the permanent magnet angle and the torque-to-inertia ratio when the groove angle is 90'.

The torque-to-inertia ratio which is the ratio of the torque constant to the moment of inertia is now discussed. In FIG. 8, φ shows a magnet angle, and δ shows a coil winding angle. In FIG. 9, θ shows the angle of each groove 50. FIG. 10 is a characteristic graph showing the relation between the angle φ of the permanent magnet 11 and the torque-to-inertia ratio when the groove angle θ is 90°. Because it is found from FIG. 10 that the torque-to-inertia ratio is reduced by about 1.5% maximally when the groove angle θ is 90° and the thickness of the parting line 60 is not larger than 0.1 mm, reduction of the torque-to-inertia ratio due to parting can be prevented if the torque-to-inertia ratio is not smaller than 1.015 when reduction of the torque-to-inertia ratio by at maximum 1.5% is calculated. Accordingly, it is found that the torque-to-inertia ratio is substantially not smaller than 1 if the permanent magnet angle ϕ is in a range of 58° to 72° when the thickness of the parting line is not larger than 0.1 mm. For this reason, power consumption can be reduced in view of the torque-to-inertia ratio if the permanent magnet angle ϕ is in a range of 58° to 72°. Preferably, the maximum torque-to-inertia ratio can be obtained when the permanent magnet angle ϕ is about 65°. What is meant by this is that power consumption can be reduced if the permanent magnet angle ϕ is in a range of 58° to 72°, and that the power consumption reducing effect is maximized if about 65° is selected as the permanent magnet angle ϕ. Incidentally, in the example shown in FIG. 8, the coil winding angle δ is also 60°.

Figure 11:
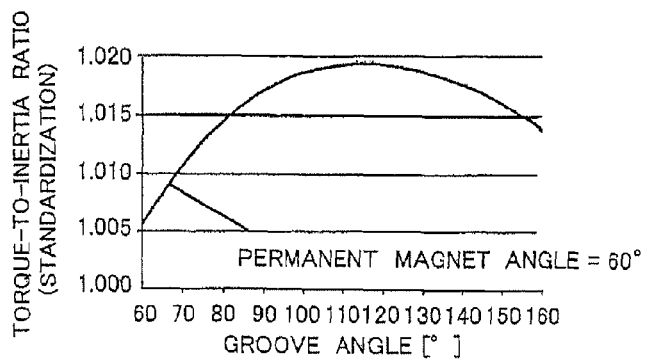
FIG. 11 is a characteristic graph showing the relation between the groove angle and the torque-to-inertia ratio when the permanent magnet angle is 60°.

FIG. 11 is a characteristic graph showing the relation between the angle θ of the groove 50 and the torque-to-inertia ratio when the permanent magnet angle ϕ is fixed to 60°. It is found from FIG. 11 that reduction of the torque-to-inertia ratio due to parting can be prevented for the same reason as described above if the torque-to-inertia ratio is not smaller than 1.015 when the thickness of the parting line 60 is not larger than 0.1 mm. Accordingly, it is found that the torque-to-inertia ratio is substantially not smaller than 1 if the groove angle θ is in a range of 85° to 155° when the thickness of the parting line is not larger than 0.1 mm. For this reason, power consumption can be reduced in view of the torque-to-inertia ratio if the groove angle θ is in a range of 85° to 155°. Preferably, the maximum torque-to-inertia ratio can be obtained when the groove angle θ is about 120°. What is meant by this is that power consumption can be reduced if the groove angle θ is in a range of 85° to 155°, and that the power consumption reducing effect is maximized if the groove angle θ is selected to be about 120°.

Figure 12:
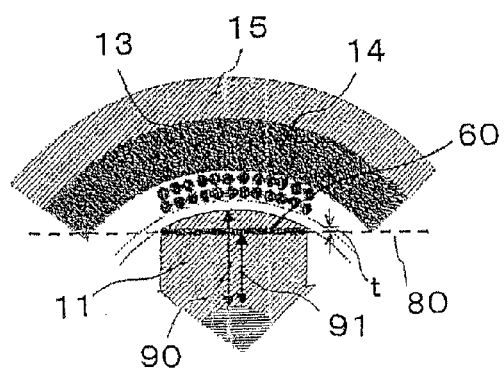
FIG. 12 is a sectional view showing the configuration of important part of the rotor for explaining the thickness of each parting line.

FIG. 13 shows the decreasing rate of eddy current loss in the case where the thickness t of the parting line 60 is changed in the same condition as shown in FIG. 12, i.e. in the condition that the diameter of the permanent magnet 11 is 19.6 mm, the diameter of the shaft is 8 mm and the position of the parting line is 77.4% of the thickness of the permanent magnet. This example shows the decreasing rate of eddy current loss in the case where the thickness t of the parting line 60 is changed to estimated values of 0.05 mm, 0.10 mm, 0.15 mm and 0.20 mm successively. It is found from FIG. 13 that the decreasing rate of eddy current loss is in a range of 55% to 57%, and that the decreasing rate of eddy current loss is substantially equivalent if the thickness t of the parting line 60 is in the aforementioned range. Incidentally, the parting line 60 is shaped like a straight line having a wide section by the thickness t. The same rule applies to Embodiments 2 to 4 which will be described later.

Accordingly, power consumption can be reduced efficiently if the aforementioned range of the permanent magnet angle ϕ and the aforementioned range of the groove angle θ are combined. It is found that the thickness t of the parting line 60 need not be considered particularly on this occasion because the same result can be obtained if the thickness t of the parting line 60 is in the estimated range.

The shape of the parting line is now further discussed.

FIG. 14 is a cross sectional view of a glavanoscanner having broken line-shaped parting lines 61. FIG. 15 is an enlarged view of important part in FIG. 14. FIG. 16 is a view showing the decreasing rate of eddy current loss in the shape shown in FIGS. 14 and 15. FIGS. 14 to 16 show a modification of the aforementioned embodiment. Incidentally, a parting open angle α which is the center angle of a broken line capable of forming a parting line 61 is in a range of 102° to 180°. If the parting open angle α is smaller than 102°, a V shape cannot be formed because a pointed end of the V shape interferes with the shaft 10. If the parting open angle α is 180°, the shape of the broken line does not make sense because the parting line 61 becomes equal to the parting line 60 provided as a straight line. Therefore, when the parting open angle α is changed in a range of 102° to 180°, the parting line cutting position 93 from the shaft is 77.4%, the diameter of each permanent magnet is 19.6 mm, the diameter of the shaft is 8 mm and the thickness of each parting line is 0.1 mm, the decreasing rate of eddy current loss can be calculated as shown in FIG. 16.

It is found from the result shown in FIG. 16 that the decreasing rate of eddy current loss of not smaller than 50% can be obtained regardless of the parting open angle α. Preferably, when the parting open angle α is 120°, the decreasing rate of eddy current loss is 73%. It is found that most efficiency is obtained if the parting open angle α is set to be about 120° when the broken line-shaped parting lines 61 are provided.

The reason why reduction of power consumption can be attained when the torque-to-inertia ratio which is the ratio of the torque constant to the moment of inertia is improved is as follows.

That is, in a moving magnet type galvanoscanner 1, rotational torque depends on a current flowing in each of the coils 13 and a magnetic flux linking with the coils 13. A magnetic flux is generated by the permanent magnets 11 and the coils 13 in the galvanoscanner 1. Lines of magnetic flux linking with the coils 13 are mainly based on magnetic flux in permanent magnet portions facing the coils 13. On the other hand, magnetic flux in permanent magnet portions facing portions not wound with the coils 13 (coil hollow portions 17) makes a relatively small contribution to torque because the magnetic flux does not link with the coils 13. Accordingly, when portions of the permanent magnets 11 facing the coil hollow portions 17 are removed, the torque-to-inertia ratio which is the ratio of the torque constant to the moment of inertia can be improved. To make this possible, in accordance with the invention, grooves are formed in the axial direction of the outer circumference of the permanent magnets 11 and at places where the magnetic poles of the permanent magnets are adjacent to one another, so that the grooves straddle the magnetic poles. Consequently, the coil current required at driving time can be reduced so that power consumption at driving time can be reduced.

Embodiment 2

Embodiment 2 is configured so that the permanent magnet 11 is parted circumferentially by parting lines 62 extending radially. FIG. 17 is a cross sectional view of a galvanoscanner according to Embodiment 2. FIG. 18 is an enlarged view of important part in FIG. 17. FIG. 19 is a view showing the decreasing ratio of eddy current loss in Embodiment 2 shown in FIGS. 17 and 18.

When the thickness of each parting line is 0.1 mm, the diameter of each permanent magnet is 19.6 mm and the diameter of the shaft is 8 mm, an angle β between the parting lines 62 has limits of 44° and 94° to presence of adjacent magnets independent of each other at boundary portions. For this reason, the angle β can be set to be in a range 44°<β<94°. What is meant by this is that the permanent magnet 11 can be parted when β is in the aforementioned range. Therefore, the decreasing ratio of eddy current loss in the case of β=44, 60, 94 in the aforementioned condition can be calculated as shown in FIG. 19. It is found from the calculation result that the decreasing ratio of eddy current loss in this embodiment is not smaller than 37%, and that at maximum 65% is obtained when the angle β between adjacent parting lines 62 is 94°.

Accordingly, in the case where the permanent magnet 11 is parted as described in Embodiment 2, most efficiency can be obtained when the angle β between adjacent parting lines 62 is 94°.

Since other portions not particularly mentioned have one and the same configuration and function as those in Embodiment 1, duplicated description thereof will be omitted.

Embodiment 3

Embodiment 3 is configured so that the permanent magnet 11 is parted circumferentially by parting lines 62 extending radially and further parted radially by a parting line 60 as a straight line, that is, Embodiments 1 and 2 are combined. FIG. 20 is a cross sectional view of a galvanoscanner according to Embodiment 3. FIG. 21 is an enlarged view of important part in FIG. 20. FIG. 22 is a view showing the decreasing ratio of eddy current loss in Embodiment 3 shown in FIGS. 20 and 21.

Also in Embodiment 3, in one and the same condition as in Embodiments 1 and 2, that is, in the condition that the diameter of each permanent magnet is 19.6 mm, the diameter of the shaft is 8 mm and the thickness of each parting line is 0.1 mm, the permanent magnet 11 can be parted circumferentially when the angle β between adjacent parting lines 62 is in a range of 44° to 94° in the same manner as in Embodiment 2. FIG. 22 shows a result of decreasing ratio of the percentage of eddy current loss in the condition that the parting lines 60 for parting the permanent magnet 11 radially are fixed while the angle β is set to be in the aforementioned range. It is found from the calculation result that the decreasing ratio of eddy current loss in the case of Embodiment 3 is not smaller than 70% and at maximum 82%. Accordingly, in the case where the permanent magnet 11 is parted as described in Embodiment 3, most efficiency can be obtained when the angle β between adjacent parting lines 62 is 94° while the parting lines 60 are fixed.

Since other portions not particularly mentioned have one and the same configuration and function as those in Embodiments 1 and 2, duplicated description thereof will be omitted.

Embodiment 4

Figures 25, 26:
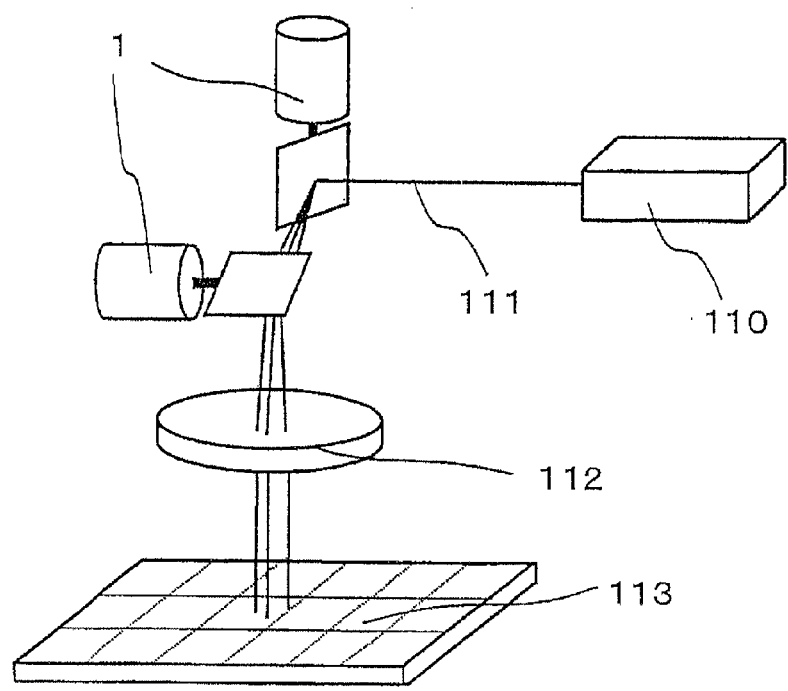
FIG. 25 is a view showing the decreasing rate of eddy current loss in the galvanoscanner according to Embodiment 4.
FIG. 26 is a diagram showing the schematic configuration of a laser processing machine using galvanoscanners implemented heretofore.

Embodiment 4 is configured so that the parting lines 60 as straight lines for parting the permanent magnets 11 radially in Embodiment 3 are replaced by broken line-shaped parting lines 61. That is, Embodiment 4 is configured so that a modification of Embodiment 1 and Embodiment 3 are combined. FIG. 23 is a cross sectional view of a galvanoscanner according to Embodiment 4. FIG. 24 is an enlarged view of important part in FIG. 23. FIG. 25 is a view showing the decreasing ratio of eddy current loss in Embodiment 4 shown in FIGS. 23 and 24.

Also in Embodiment 4, in one and the same condition as in Embodiments 1 and 2, that is, in the condition that the diameter of each permanent magnet is 19.6 mm, the diameter of the shaft is 8 mm and the thickness of each parting line is 0.1 mm, the permanent magnet 11 can be parted circumferentially when the angle β between adjacent parting lines 62 is in a range of 44° to 94° in the same manner as in Embodiment 2. FIG. 25 shows a result of calculation of the decreasing ratio of eddy current loss in the condition that the parting cutting position 93 from the shaft 10 and the parting open angle α of the parting line 61 are fixed to 77.4% and 120° respectively while the angle β is set to be in the aforementioned range. It is found from the calculation result that the decreasing ratio of eddy current loss in the case of Embodiment 4 is not smaller than 78% and at maximum 80%. Accordingly, in the case where the permanent magnet 11 is parted as described in Embodiment 4, most efficiency can be obtained when the angle β between adjacent parting lines 62 is 60° while the parting cutting position 93 and the parting open angle α of the parting line 61 are fixed.

Since other portions not particularly mentioned have one and the same configuration and function as those in Embodiments 1 and 2, duplicated description thereof will be omitted.

As described above, in accordance with the embodiments, the ratio of the torque constant to the moment of inertia in the galvanoscanner can be improved and, accordingly, the current required for driving is made so small that power consumption at driving time can be reduced. At the same time, the eddy current generated in the permanent magnet can be reduced. Consequently, increase of the temperature of the permanent magnet caused by power consumption at driving time can be suppressed.

Incidentally, the invention is not limited to the aforementioned embodiments and can be modified variously without departing from the gist of the invention. The subject of the invention covers all technical items included in the technical thought described in Claims. Although the respective embodiments have been described as preferred embodiments, those skilled in the art can achieve various alternate examples, modified examples, changed examples or improved examples from the contents disclosed in this specification, and these are included in the scope defined by the accompanying Claims.

What is claimed is:

1. A galvanoscanner comprising:
a rotor including a shaft as a rotational center, and permanent magnets disposed around the shaft and polarized to a plurality of poles in a circumferential direction of the shaft; and
a stator disposed in the outside of the rotor through a clearance and including coils, a yoke, and an outer casing so that the rotor swings in a predetermined angle range;
wherein
the permanent magnets are parted into at least two parts per pole by parting lines, and
each of the parting lines has a section shaped like at least one straight line for parting corresponding one of the permanent magnets circumferentially.

2. A galvanoscanner comprising:
a rotor including a shaft as a rotational center, and permanent magnets disposed around the shaft and polarized to a plurality of poles in a circumferential direction of the shaft; and
a stator disposed in the outside of the rotor through a clearance and including coils, a yoke, and an outer casing so that the rotor swings in a predetermined angle range;
wherein
the permanent magnets are parted into at least two parts per pole by parting lines,
the permanent magnets are provided with grooves which are formed in a direction of the rotation shaft so as to straddle circumferentially adjacent magnetic poles of the permanent magnets, and
each of the parting lines has a section shaped like at least one straight line for parting corresponding one of the permanent magnets circumferentially.

3. A galvanoscanner comprising:
a rotor including a shaft as a rotational center, and permanent magnets disposed around the shaft and polarized to a plurality of poles in a circumferential direction of the shaft; and a stator disposed in the outside of the rotor through a clearance and including coils, a yoke, and an outer casing so that the rotor swings in a predetermined angle range;

wherein the permanent magnets are parted into at least two parts per pole by parting lines, the permanent magnets are provided with grooves which are formed in a direction of the rotation shaft so as to straddle circumferentially adjacent magnetic poles of the permanent magnets, the grooves are always located at places facing hollow portions not wound with the coils in the swinging range of the galvanoscanner, and each of the parting lines has a section shaped like at least one straight line for parting corresponding one of the permanent magnets circumferentially.

* * * * *